Sept. 27, 1966 R. E. BARNETT ETAL 3,275,473
BATTERY GRID
Filed Jan. 3, 1964
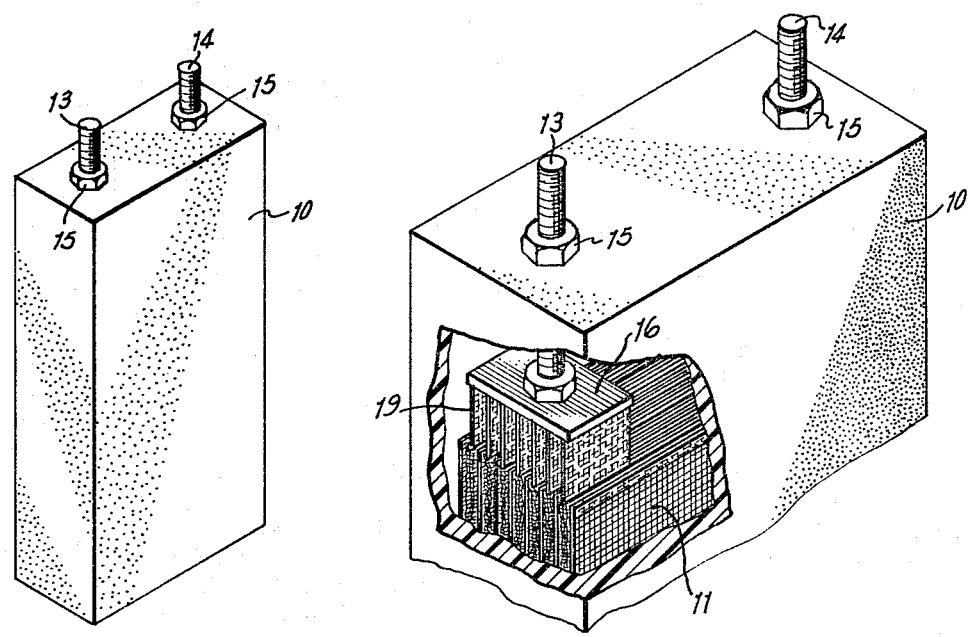
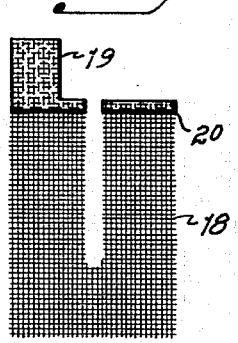
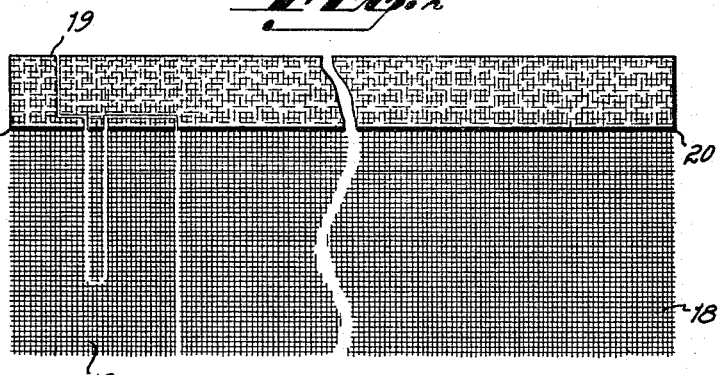
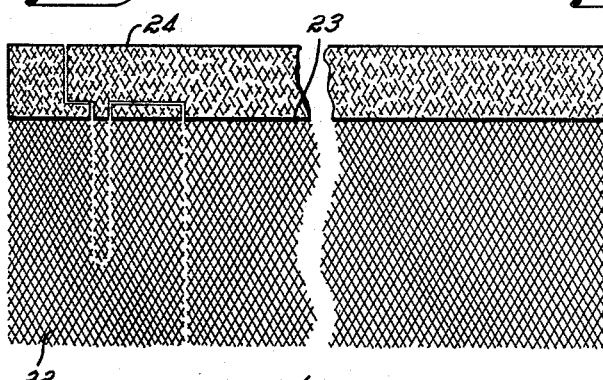
INVENTORS.
Robert E. Barnett
BY James M. Dines
Wood, Herron & Evans
ATTORNEYS

United States Patent Office 3,275,473
Patented Sept. 27, 1966

3,275,473
BATTERY GRID
Robert E. Barnett and James M. Dines, both of Joplin, Mo., assignors to The Eagle-Picher Company, Cincinnati, Ohio, a corporation of Ohio
Filed Jan. 3, 1964, Ser. No. 335,498
3 Claims. (Cl. 136—64)

This invention relates to electrolytic cells such as storage batteries, electrical accumulators and the like. More particularly, it relates to the construction and method of making the grids or equivalent structure employed in such electrolytic cells to support or act as the base of the active electrode materials.

One form of electrodes which are conventionally employed are fabricated from a woven or expanded metal screen which is subsequently plated with the active metal to produce electrodes for electrolytic cells such as acid and lead, or the alkaline nickel iron, or nickel and cadmium, or nickel and zinc, or silver peroxide and zinc, or nickel and nickel, type cells.

In one preferred form each of the electrodes is of generally rectangular configuration and includes an upstanding tab. The tabs of the electrodes of like polarity are welded or otherwise secured together to form a parallel electrical connection between the plurality of cells forming the battery. The line of juncture of the tab and the main rectangular grid portion is particularly vulnerable to fracture.

The principal object of the present invention is to provide an improved metal grid or screen for use in electrolytic cells which will not break even when the cell is subjected to severe vibration. To this end we have discovered that dipping of the tab and adjacent edge portion of the grid in an electrically conductive molten metal produces a grid having improved strength and vibration characteristics.

One important advantage obtained from a dipped reinforced grid of the present invention is that a gradual transition is effected between the reinforced tab and the nonreinforced main grid portion. In short, there is no sharp line of demarcation between the reinforced and nonreinforced portions representing a high stress line. The gradual transition is due to the fact that when the grid is dipped, the wetting effect of the molten metal on the grid causes a gradual, slightly irregular build-up of solder between the fully open and fully closed pores in the grid.

A still further advantage of the present invention is that the solid dipped lug portion not only possesses an increased strength, but also has a substantially greater conductivity. Moreover, this is achieved without appreciably increasing the thickness of the grid or interfering with the open grid characteristics in the active material area of the grid.

These and other objectives and advantages of the invention will be more readily apparent from the following description of the drawings in which:

FIGURE 1 is a perspective view of a battery of the type to which this invention is directed.

FIGURE 2 is an enlarged perspective view of the upper portion of the battery of FIGURE 1 with a portion of the casing broken away.

FIGURE 3 is a side elevational view of a typical battery grid.

FIGURE 4 is a side elevational view of a dip reinforced screen from which electrode grids are cut.

FIGURE 5 is a view similar to FIGURE 4 but differing therefrom in that the wire screen is an expanded metal rather than woven screen.

FIGURE 6 is an enlarged side elevational view of a portion of the screen of FIGURE 5.

Referring to FIGURES 1 and 2, there is shown a battery having a plurality of electrodes made in accordance with this invention. It comprises a premolded battery case 10 which serves as a container for the cell electrodes 11 and the electrolyte (not shown). Extending from the top 10 of the case are a positive terminal 13 and a negative terminal 14 secured thereto by nuts 15. On the lower or inner end of each terminal is a terminal plate 16 to which are attached a plurality of individual electrode plates. The active electrode material of the batteries is plated to screens 18 (FIGURE 3) which are of generally rectangular shape but have upwardly extending tabs 19; the tabs of the positive plates are in alignment to one side of center of the electrodes, the tabs of the negative plates are in alignment with the other side of center. The tabs 19 of the screens are not coated with the active electrode materials and are attached to the terminal plates 16 by means of soldering, riveting or other electrically conductive means.

The battery comprises one more negative plate than positive plates, each positive plate being disposed between two negative plates. By means of this construction each positive and each negative electrode is soldered or attached directly to its proper terminal and is at least partially supported by it. For a complete description of one battery of the type to which this invention is susceptible, reference may be had to Patent No. 2,727,083, issued Dec. 13, 1955, to E. G. Hollman et al. That particular battery utilizes zinc and silver peroxide as the active material. It should be understood, however, that this invention is susceptible to use with many other types of batteries or electrolytic cells irrespective of the active electrode materials.

Referring to FIGURES 3 and 4, the invention is there shown as applied to a woven grid or screen 18. In one preferred embodiment the screen is from ten-by-ten mesh to twenty-by-twenty mesh. The mesh is primarily dependent upon the weight and type of active electrode material to be subsequently plated upon the screen. The grid may be made from any suitable material which is not corrosive to the electrolyte, one preferred material being bronze. The upper edge of the screen or grid has the pores filled with an electrically conductive metal or alloy. This metal is applied to the screen by dipping the upper edge into the metal or alloy, while it is in a molten state. By way of example, some suitable low melting point materials suitable for reinforcing the screen are lead-zinc solders, silver solders, zinc or cadmium metals or other low melting point electrically conductive metals. After cooling, the dipped edge has additional strength and conductivity. As a result of the pores of the screen having been filled by dipping, there is no appreciable increase in thickness of the screen.

The process for dip coating the grids is as follows: The coating metal, for example silver solder, is heated to just above its melting point in a boat of sufficient size and depth to coat the strip from about $\frac{1}{10}$ to $\frac{1}{4}$ of its height, as desired. The cleaned grid material is then immersed in the area desired to be coated. The grid should be immersed slowly and carefully into the molten material and then withdrawn slow and permitted to cool. A compatible flux is used as require.

After dip coating of the upper edge of the screen, a grid of the desired conformation is cut therefrom, a typical conformation being illustrated in FIGURE 3. It will be noted that the dip reinforced tab 19 does not extend all the way to the line of demarcation 20 between the dipped and undipped portion of the screen. This line of demarcation thus extends across the complete width of the grid rather than ending at the bottom of the tab or somewhere along its height. The common point of fracture or breakage of an electrode is at the bottom of the tab so that the dip reinforced section should extend below the bottom of the tab for maximum strength.

After cooling of the dipped metal, the grid is plated with the active electrode material. Thereafter, the grids are assembled into a complete battery or electrolytic cell.

Referring to FIGURES 5 and 6, there is illustrated a second embodiment of the invention. In this embodiment, the screen 22 is made from expanded metal foil as is now conventional in the battery art. This screen differs from the woven screen of FIGURES 3 and 4 in that the pores of the screen are diamond-shaped rather than rectangular. An advantage of this type of screen is that when dipped into the molten metal bath, the wetting effect of the metal on the screen causes the molten metal to fill the fine mesh pores so that the line of demarcation 23 between the dip reinforced upper edge section 24 and the unreinforced screen 22 produces a saw toothed line of demarcation as may clearly be seen in FIGURE 6. Thus, there is a gradual transition from open mesh grid to solid dip reinforced grid which eliminates a linear stress line. Failure of the grid usually occurs along the line of demarcation or stress line. An irregular or nonlinear stress line is desirable because of its increased strength characteristics.

From the following disclosure of the general principles of the present invention and the above description of a preferred embodiment, those skilled in the art will readily comprehend various modifications and changes of materials to which the invention is susceptible. Therefore, we desire to be limited only by the scope of the following claims.

Having described our invention, we claim:

1. A grid for use in electrolytic cells, said grid having a generally rectangular main portion and a tab portion extending from one edge of said rectangular main portion, said grid being formed of a fine wire mesh screen, said tab and an adjacent edge portion of said screen extending from $\frac{1}{10}$ to $\frac{1}{4}$ of the height of said screen being reinforced by metal applied to said screen by dipping said screen in a molten bath of said metal, said metal filling the interstices of said tab and adjacent edge portion, the interstices of the remainder of said screen being open.

2. A grid for use in electrolytic cells, said grid having a generally rectangular main portion and a tab portion extending from one edge of said rectangular main portion, said grid being formed of a fine woven wire mesh screen, said tab and an adjacent edge portion of said screen extending from $\frac{1}{10}$ to $\frac{1}{4}$ of the height of said screen being reinforced by metal applied to said screen by dipping said screen in a molten bath of said metal, said metal filling the interstices of said tab and adjacent edge portion, the interstices of the remainder of said screen being open.

3. A grid for use in electrolytic cells, said grid having a generally rectangular main portion and a tab portion extending from one edge of said rectangular main portion, said grid being formed of a fine expanded metal wire mesh screen, said tab and an adjacent edge portion of said screen extending from $\frac{1}{10}$ to $\frac{1}{4}$ of the height of said screen being reinforced by metal applied to said screen by dipping said screen in a molten bath of said metal, said metal filling the interstices of said tab and adjacent edge portion, the interstices of the remainder of said screen being open.

References Cited by the Examiner

UNITED STATES PATENTS

| | | | |
|---|---|---|---|
| 600,250 | 3/1898 | Reese | 117—99 |
| 631,366 | 8/1899 | Golding | 117—114 |
| 2,679,547 | 5/1954 | Fischbach et al. | 136—36 |
| 2,880,258 | 3/1959 | Pucher et al. | 136—30 |

WINSTON A. DOUGLAS, *Primary Examiner.*

A. SKAPARS, *Assistant Examiner.*